United States Patent [19]

Yamauchi

[11] Patent Number: 4,918,661
[45] Date of Patent: Apr. 17, 1990

[54] OPTICAL DISK

[75] Inventor: Keiichi Yamauchi, Saitama, Japan

[73] Assignee: Pioneer Electronic Corporation, Tokyo, Japan

[21] Appl. No.: 284,005

[22] Filed: Dec. 13, 1988

Related U.S. Application Data

[62] Division of Ser. No. 69,084, Jul. 2, 1987, Pat. No. 4,817,068.

[30] Foreign Application Priority Data

Jul. 3, 1986 [JP] Japan ................................. 61-157535

[51] Int. Cl.4 .............................................. G11B 17/22
[52] U.S. Cl. ..................................... 369/30; 369/116; 369/275; 358/342
[58] Field of Search .................... 358/342; 369/30, 32, 369/50, 275; 360/35.1

[56] References Cited

U.S. PATENT DOCUMENTS

| | | | |
|---|---|---|---|
| 4,065,795 | 12/1977 | Shutterly | 360/35.1 |
| 4,229,808 | 10/1980 | Hui | 358/342 |
| 4,476,499 | 10/1984 | Kanamaru et al. | 358/342 |
| 4,490,810 | 12/1984 | Hon | 364/900 |
| 4,535,439 | 8/1985 | Satoh et al. | 369/32 |
| 4,558,375 | 12/1985 | Sontheimer | 358/342 |
| 4,672,472 | 6/1987 | Sugiyama | 358/342 |
| 4,672,473 | 6/1987 | Sugiyama | 358/342 |
| 4,750,059 | 6/1988 | Syracuse | 369/50 |
| 4,796,098 | 1/1989 | Giddings | 358/342 |
| 4,797,752 | 1/1989 | Giddings | 358/342 |

Primary Examiner—Donald McElheny, Jr.
Attorney, Agent, or Firm—Sughrue, Mion, Zinn, Macpeak & Seas

[57] ABSTRACT

An optical disk and an apparatus for recording/reproducing on the disk. The disk has extra tracks that are used for tracing by the pickup when the apparatus is started or remains in a pause mode longer than a predetermined time. The intensity of the light emitted by the pickup can be reduced while scanning the extra tracks.

5 Claims, 6 Drawing Sheets

OPTICAL DISK

This is a Division of application Ser. No. 07/069,084, filed July 2, 1987 U.S. Pat. No. 4,817,068.

BACKGROUND OF THE INVENTION

1. Field of the Invention

The present invention relates to an optical disk and an optical disk apparatus in which information is optically recorded and reproduced on a predetermined recording layer on the disk.

2. Background of the Invention

Recently, optical disks have been developed and many of them have been commercialized. The optical disks use metal, coloring matter, and the like, in information recording layers and are capable of being reproduced after recording has been made. However, the information which has been once recorded cannot be re-recorded or written over. In spite of such an inconvenience, attention is particularly paid to the optical disks because the optical disks have a capacity relatively larger than other recording media.

In a conventional optical disk apparatus, on the other hand, a pickup (that is, an information detecting point) is caused to repeatedly trace the last track (a pause track) on which the recording/reproducing operation was ended at the last time. As shown in FIG. 5, the pickup repeatedly traces a spiral track with repeated track jumps in a so-called pause mode in which the information recording/reproducing operation is temporarily interrupted (or in a wait state). If one and the same pause track is thus repeatedly traced for a long time, however, there has been a risk of damage of recorded information on the pause track depending on the material of a recording layer even if the intensity of light is adjusted in advance to be small enough not to cause any substantial change in the recorded information in a normal reproducing operation.

SUMMARY OF THE INVENTION

It is therefore an object of the present invention to eliminate the disadvantages in the prior art.

It is another object of the present invention to provide an optical disk apparatus in which a pickup traces predetermined tracks including tracks other than a pause track in a pause mode.

It is still another object of the present invention to provide an optical disk apparatus in which a pickup traces a land between adjacent tracks in a pause mode.

In order to achieve the above objects, according to the present invention, in the optical disk provided with tracks formed in advance so as to be traced by a pickup, the tracks are grouped into those belonging to a first region to be traced by the pickup when information recording and reproducing is performed, and those belonging to a second region to be traced in a pause mode, substantially none of the information being recorded or reproduced on the tracks belonging in the second region.

That is, on the optical disk, the tracks are formed in advance so that the pickup produces a tracking error while tracing the tracks. The tracks are grouped into those belonging to a first region to be traced by the pickup when information recording and reproducing is performed, and those belonging to a second region to be traced in a pause mode. Substantially none of the information is recorded or reproduced on the tracks belonging in the second region.

BRIEF DESCRIPTION OF THE DRAWINGS

Other objects and advantages of the invention will become apparent during the following discussion of the accompanying drawings, wherein.

DETAILED DESCRIPTION OF PREFERRED EMBODIMENT

Figure 1:
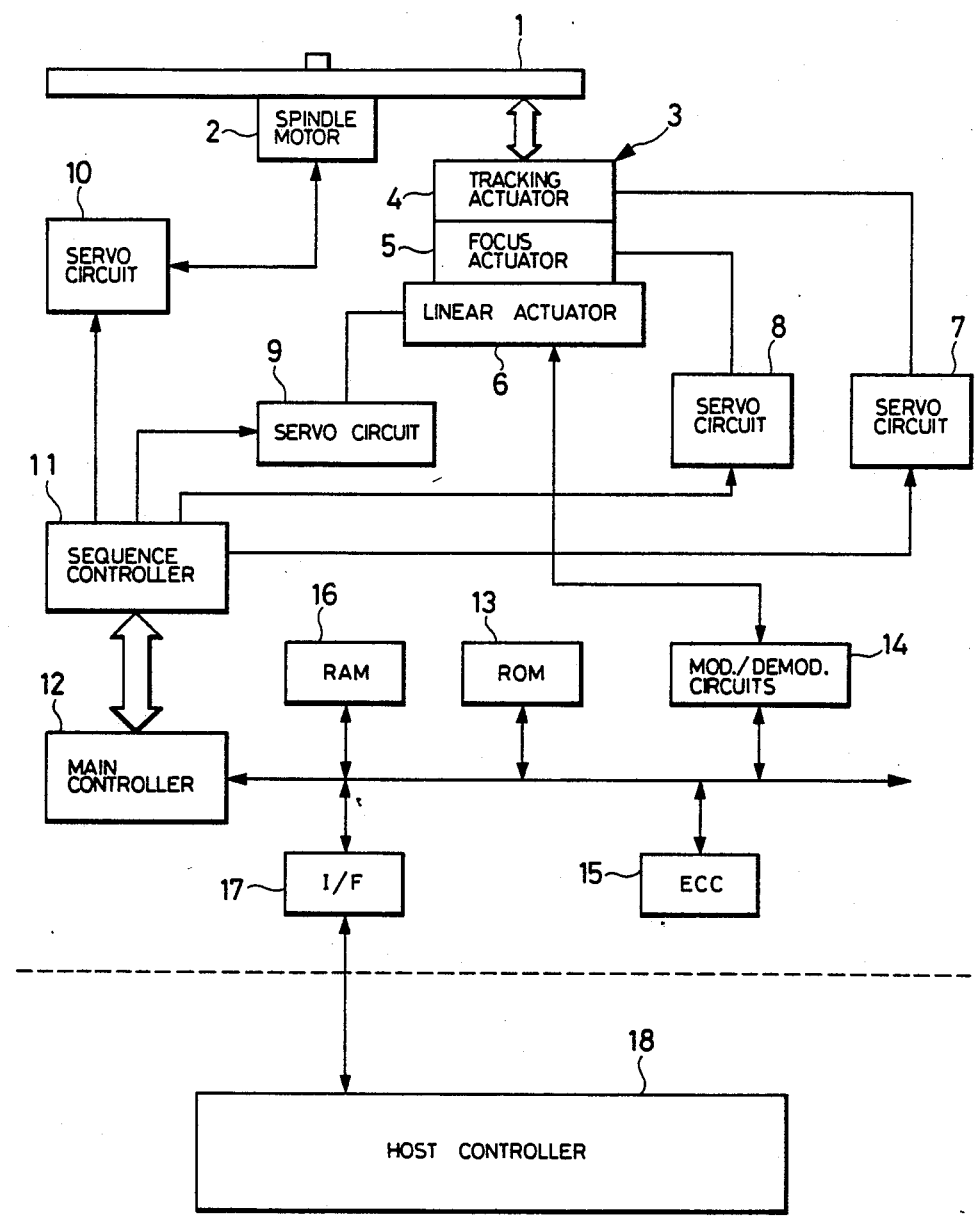
FIG. 1 is a block diagram showing an optical disk apparatus according to the present invention.

Referring to the drawings, preferred embodiments of the present invention will be described hereunder.

FIG. 1 is a block diagram showing an optical disk apparatus according to the present invention. An optical disk 1 is rotated at a predetermined speed by a spindle motor 2. The speed is controlled by a spindle servo-circuit 10. A pickup 3 includes a light source such as a semiconductor laser, or the like, so that light radiated from the light source is made to impinge onto the optical disk 1 to perform information recording and reproducing on the disk. The pickup 3 is provided with a tracking actuator 4 for controlling the horizontal position of the light so that the light can track a track and with a focus actuator 5 for focusing the light on an information recording layer of the optical disk 1. The pickup 3 is moved by a linear actuator 6 relative to the optical disk 1 in its radial direction. Servo-circuits 7, 8 and 9 are provided for controlling respectively the tracking actuator 4, the focus actuator 5, and the linear actuator 6. Those servo-circuits 7 through 10 are controlled by a sequence controller 11 to operate in accordance with a predetermined sequence. A main controller 12 is arranged to perform predetermined operations of the sequence in accordance with a program stored in ROM 13 to control the circuit and the other elements. A modulation/demodulation circuit 14 is provided to demodulate a reproduced signal from the pickup 3 or to modulate a recording signal in a predetermined manner so as to apply the modulated signal to the pickup 3. An error-correction coding circuit 15 is arranged to correct any error in the reproduced signal or to add an error-correction code to the recording signal so as to output the recording signal with the error-correction code. A RAM 16 stores the reproduced signal or the recording signal. The reproduced signal and the recording signal are transferred mutually between a host controller 18 and the main controller 12 through an interface 17.

Figure 2:
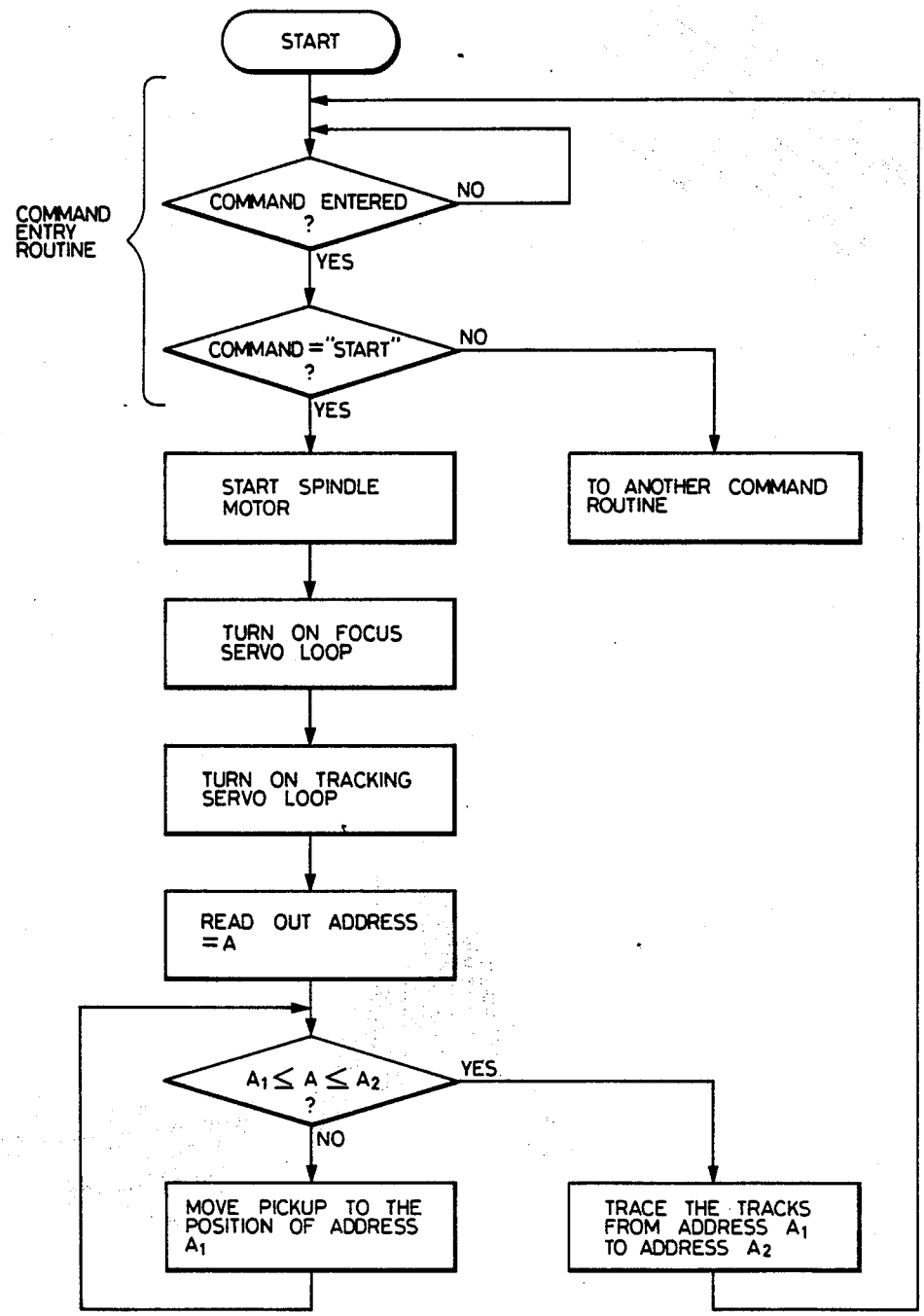
FIG. 2 and 3 are flowcharts for explaining the operation of the apparatus.

The operation at the start is performed, for example, in accordance with the flowchart shown in FIG. 2. At first, in a command entry routine, the main controller 12 or the host controller 18 monitors whether or not any command is entered. When a command other than that instructing a start is entered, the routine is shifted to another command routine. When the entered command is that one instructing a start, an output is applied successively to the servo-circuit 10, the servo-circuit 8, and the servo-circuit 7 through the sequence controller 11 so that the spindle motor 2 is rotated, a focus servo loop is turned on, and a tracking servo loop is turned on.

Next, an address where the pickup 3 is positioned is read out by the controller 12 or the controller 18 from a signal reproduced from the optical disk 1 and processed by the modulation/demodulation circuit 14. When the readout address A is not between predetermined addresses $A_1$ and $A_2$, a control signal is applied to the servo-circuit 9 or to the servo circuit 7 to search the address $A_1$. That is, the position of the pickup 3 is moved to the position of the address $A_1$. When the address A of the pickup 3 assumes the value $A_1$ (between the values $A_1$ and $A_2$), the tracking servo loop which has been turned off in the search operation is turned on again and the pickup 3 traces (reproduces) the tracks from the address $A_1$ to the address $A_2$. When the pickup 3 reaches the track of the address $A_2$, the track with the address $A_1$ is searched again. When the track is searched, the tracking operation of the pickup 3 is repeated to reach the track at the address $A_2$. In a pause mode in which the pickup 3 thus repeatedly traces on the tracks between the addresses $A_1$ and $A_2$, the state of the command entry routine is monitored so that when any command is entered, the operation is shifted to the routine of the entered command.

Figure 3:
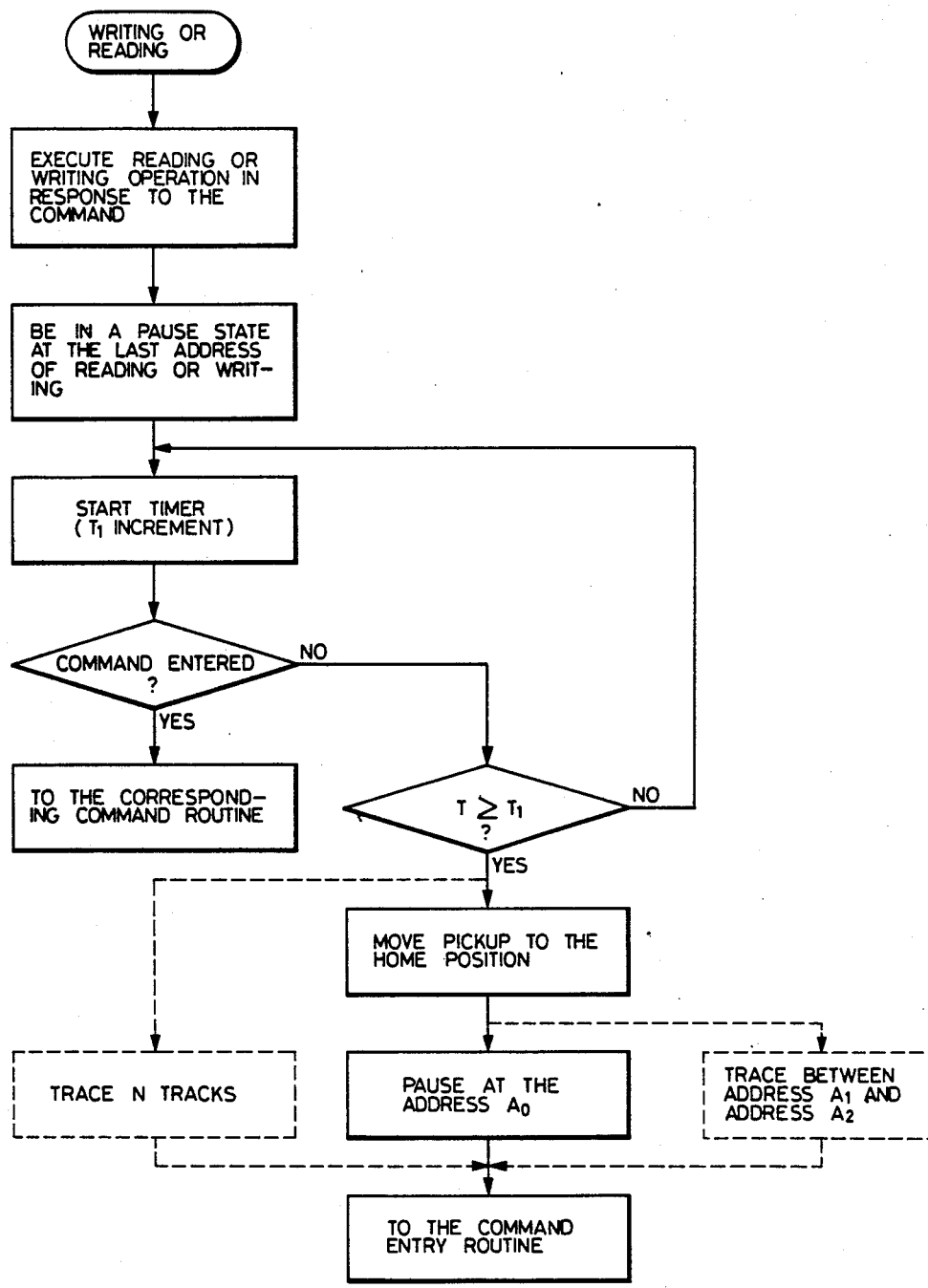

In writing or reading, the operation is carried out in accordance with the flowchart as shown in FIG. 3. That is, when a writing or reading command is entered, the writing or reading operation is executed in response to the command. When the writing or reading operation is completed, the pickup jumps back to the one track of the last address (pause track) and this track is repeatedly traced. At that time, a timer is started and, if another command is entered within a predetermined time $T_1$, the operation is shifted to the routine of the entered command. When no command is entered within the predetermined time $T_1$, the pickup 3 is moved to predetermined region, i.e., a home position on the innermost circumference. The pickup 3 remains in a pause state by repeatedly tracing the track with an address $A_0$ in the home position on the innermost circumferences so as to wait for the entry of the next command. Alternatively, the pickup 3 may be caused to trace not one track of the address $A_0$ but a plurality of tracks from an address $A_{01}$ to an address $A_{02}$ within the region of home position.

Further, the pickup 3 may be caused to trace not the track in the home position but tracks between the predetermined addresses $A_1$ and $A_2$ within an arbitrarily set region similarly to the case described above, or may be caused to trace not the track of a preset address but a plurality of tracks N in number in the vicinity of the pause track upon termination of carrying out of the last command.

Of course, in the start operation, the pickup 3 may be caused to trace tracks N in number in the home position or in the starting position.

Thus, in the starting operation, or in the pause mode in the writing/reading operation, the pickup is caused to trace the track/tracks other than the pause track upon termination of the last command execution, so that the recorded information in the pause track can be prevented from being damaged.

Figure 4:
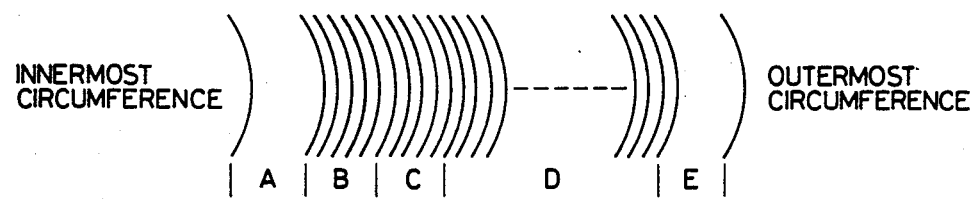
FIG. 4 is a diagram for explaining the regions of the optical disk according to the present invention.
Figure 5:
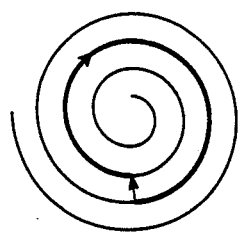
FIG. 5 is a diagram for explaining track jump.

As shown in FIG. 4, assume that track regions B, C and D to be traced by the pickup 3 are formed between a non-track region. A in the innermost circumference and another non-track region E in the outermost circumference. The tracks, for example, in the region B are then used for a producer of the optical disk 1 to record necessary information. Further, the tracks in the region D are used for a user to record desired information. The tracks in the intermediate region C can be made to be the tracks of the above-mentioned home address $A_0$ (or multiple addresses $A_{01}$ through $A_{02}$), that is, to be the tracks for the exclusive use of the pause. Of course, the region B for the producer and the region C for the pause may be reversed in positional relation to each other. Because substantially no information is recorded on the tracks in the region C for the exclusive use of the pause, the region C can be made of a material different from that of the regions B and D, that is, can be made of a material which is hardly changed in quantity as well as in shape even if the material is irradiated with light for a long time.

Because the tracks of the addresses $A_1$ through $A_2$ are established in the region D, it is preferable to make the region D relatively wide.

Further, in the pause mode, the intensity of light may be made weaker or smaller (including zero, that is, to be off) than that in the normal information-reproducing operation. The control of the light intensity can be implemented by, for example, changing the level of the voltage applied to a laser diode from a high level to a low level or vice versa. Therefore, when the servo, for example, for the focusing-servo, tracking-servo, or the like, becomes difficult, the gain of the servo can be made larger in the pause mode than that in the normal reproducing operation. In this regard, an advantageous effect can be obtained such that the intensity of light can be made weaker. Further advantageous effect can be obtained if in the pause mode the pickup traces particular tracks in a manner described above while reducing the intensity of light.

As described above, according to the present invention, in an optical disk provided with tracks formed in advance so as to be traced by a pickup, the tracks are grouped into those belonging to a first region to be traced by the pickup when information recording/reproducing is performed, and those belonging to a second region to be traced in a pause mode, substantially no information being recorded/reproduced on the tracks belonging in the second region. Accordingly, the recorded information can be prevented from being damaged even if the optical disk is irradiated with the light continuously for a long time in the pause mode.

Another embodiment of the present invention will next be described. In this embodiment, the pickup traces a land between adjacent tracks in a pause mode.

Figure 6:
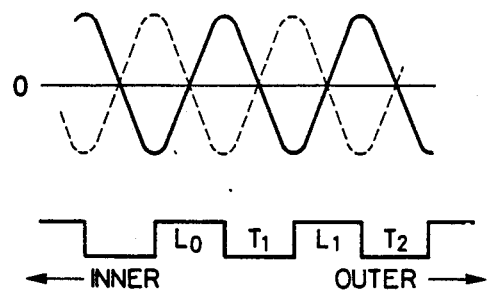
FIG. 6 is a waveform diagram of a tracking error signal.

In a recording/reproducing mode, assume that the tracking error signal is such that the level increases in the direction of positive polarity when the pickup 3 moves toward the innermost circumference of the optical disk 1 (i.e., in the left direction in the FIG. 6) and that the level increases in the direction of negative polarity when the pickup 3 moves toward the outermost circumference of the optical disk 1 (i.e., in the right direction in the FIG. 6), as shown by a solid line in FIG. 6. During the movement of the pickup toward the innermost circumference of the disk 1, if the apparatus is put in the pause mode, the polarity of the tracking error signal will be reversed as shown by a dotted line in FIG. 6, since in the pause mode, the pickup is jumped back toward the outermost circumference to keep tracing the same track. As a result, the tracking servo loop operates the pickup so that it traces a land $L_1$ between two adjacent tracks $T_1$ and $T_2$, assuming that the apparatus is put in the pause mode when the track $T_1$ is being traced. Whether the pickup traces a land $L_0$ at the inner circumference side of the track $T_1$ or the land $L_1$ at the outer circumference side of the track $T_1$ depends upon the position of the pickup. In order that the outer (or inner) circumference side land may always be traced under any circumstance, a jump pulse may be generated by the tracking servo circuit at the time immediately before or after the polarity of the tracking error signal is changed.

In the pause mode, the pickup operated to jump back by one track as the optical disk rotates for one revolution. During this pause mode operation, the pickup repeatedly traces the land $L_1$ adjacent the pause track $T_1$, so that even if the pause mode operation continues for a long period of time, the track $T_1$ would not be damaged.

When the pause mode is ended, the polarity of the tracking error signal returns to the original state, and the pickup again start tracing the track $T_1$. At this time, a jump pulse may be produced so that the pickup always moves to the direction of the track $T_1$. Even if the pickup moves to the opposite direction, i.e., to the direction of track $T_2$, the pickup may be controlled so as to return to the track $T_1$ by reading the address of the currently tracing track. Access time for doing so is not so long.

Figure 7:
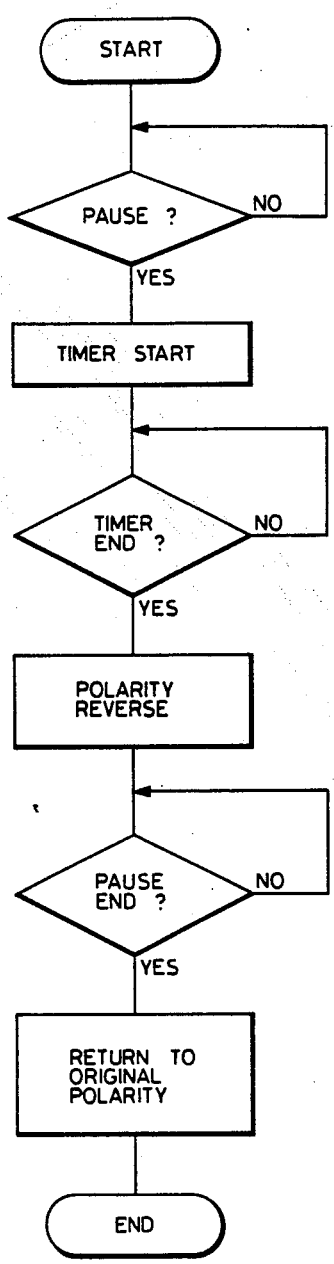
FIG. 7 is a flowchart for explaining the operation of the apparatus.

The above-described operation is illustrated by the flowchart shown in FIG. 7.

Figure 8:
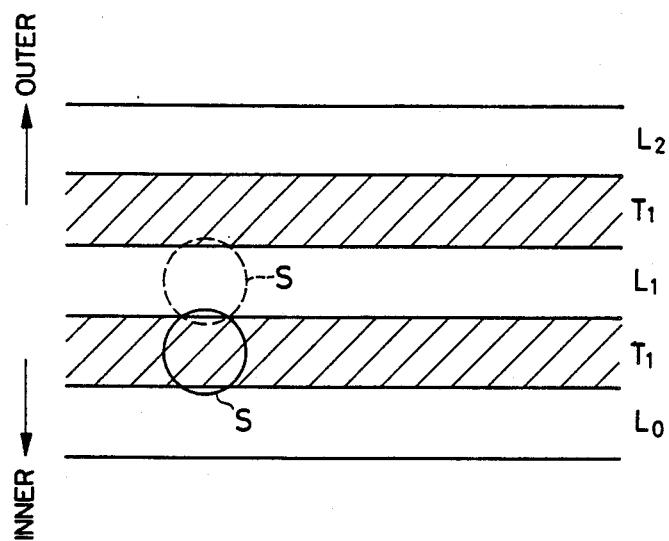
FIGS. 8 and 9 are diagrams for explaining the relationship between the track and an information detecting beam spot.
Figure 9:
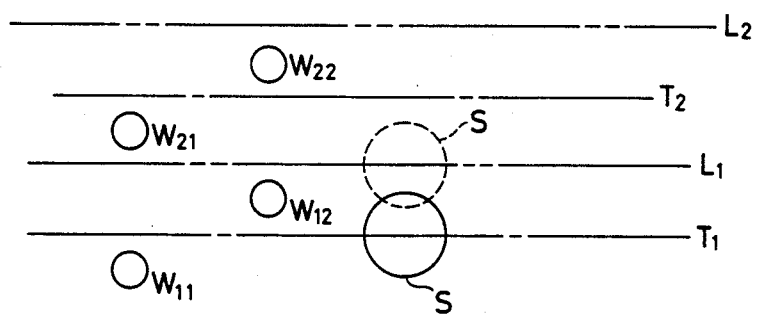

FIG. 8 is a diagram illustrating a portion of the optical disk where tracks or grooves and lands are formed in consecutive manner on the optical disk. The present invention is applicable not only to the disk shown in FIG. 8 but also to the optical disk of the sample servo type as shown in FIG. 9. In the case of sample servo type, a tracking error signal is produced from the level difference of RF signals obtained from two warbled pits $w_{11}$ and $w_{12}$ which are positioned in staggered fashion with respect to track $T_1$ (imaginary track). The tracking error signal thus produced is held until the pickup is moved to the subsequent warbled pit position. Accordingly, in the pause mode, the tracking error signal may be produced from the level difference of the RF signal obtained at the position of warbled pit $w_{12}$ for the track $T_1$ and the position of warbled pit $w_{21}$ for the adjacent track $T_2$. In CAV (Constant Angular Velocity) disks, the positions of warbled pits are aligned along the radius of the disk, the timing signals need not be changed so as to correspond to the position of the warbled pit.

It is possible to position the pickup between the tracks by adding an offset to the tracking error signal. Although it is difficult to precisely control the position of the pickup between the tracks, the pickup can roughly be positoned between the tracks.

It is further possible for the pickup to consecutively trace a plurality of tracks within a predetermined region in lieu of tracing a signal land repeatedly.

While it has been described the case where the input means (not shown) inputs a pause mode, the similar operation can be performed for the case where the pause mode is automatically set after termination of recording operation.

The present invention is also applicable to the recording/reproducing apparatus for a recording medium other than the optical disk.

According to the second embodiment of the present invention, it is advantageous in that the track from which the recorded informaiton is reproduced and the information recorded on the disk can be prevented from being damaged.

What is claimed is:

1. An optical disk, comprising a plurality of optical information tracks recorded thereon for tracing by a pickup, said tracks being divided into:
    a first group of tracks in a first region of said disk containing information to be reproduced with said pickup; and
    a second group of tracks in a second region of said disk for tracing by said pickup during a pause mode and being blank, containing none of said information to be reproduced with said pickup except address information identifying said second group of tracks for the exclusive use of the pause mode and for no other purpose.

2. An optical disk including a plurality of optical tracks thereon for tracing by a pickup of an optical disk apparatus having a pause mode, said tracks being divided into at least two groups, a first group of said tracks, all of which are in a first region of said disk, containing information to be reproduced by said pickup, and a second group of said tracks, all of which are in a second region of said disk different from said first region, dedicated exclusively to the pause mode of said optical disk apparatus and blank containing no information to be reproduced by said pickup except address codes identifying said second group of said tracks for the exclusive use of the pause mode and for no other purpose.

3. An optical disk as claimed in claim 2, further including a third group of tracks, all of which are in a third region of said disk, said second region being situated between the first and third regions, said third group of tracks containing information to be reproduced by said pickup.

4. An optical disk as claimed in claim 2 wherein the disk physical material in the first region is different from the disk physical material in the second region.

5. An optical disk as claimed in claim 3, wherein said first group of tracks contains information to be reproduced to the user of the optical disk and said third group of tracks contains control information for use by said optical disk apparatus in its control of the playback of said optical disk.

* * * * *